United States Patent
Faith et al.

(10) Patent No.: US 8,954,353 B2
(45) Date of Patent: Feb. 10, 2015

(54) MOBILE PHONE INCLUDING DYNAMIC VERIFICATION VALUE

(75) Inventors: Patrick Faith, Pleasanton, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 290 days.

(21) Appl. No.: 12/268,273

(22) Filed: Nov. 10, 2008

(65) Prior Publication Data

US 2009/0319430 A1    Dec. 24, 2009

Related U.S. Application Data

(63) Continuation of application No. 12/266,186, filed on Nov. 6, 2008.

(60) Provisional application No. 61/075,208, filed on Jun. 24, 2008.

(51) Int. Cl.
| | | |
|---|---|---|
| *G06Q 20/00* | (2012.01) | |
| *H04L 9/32* | (2006.01) | |
| *G06Q 20/32* | (2012.01) | |
| *G06Q 20/38* | (2012.01) | |
| *G06Q 20/40* | (2012.01) | |
| *G06Q 40/00* | (2012.01) | |

(52) U.S. Cl.
CPC ........ *H04L 9/32* (2013.01); *G06Q 20/32* (2013.01); *G06Q 20/322* (2013.01); *G06Q 20/385* (2013.01); *G06Q 20/40* (2013.01); *G06Q 40/00* (2013.01); *H04L 2209/56* (2013.01); *H04L 2209/80* (2013.01)
USPC .......................................................... 705/67

(58) Field of Classification Search
USPC .............. 705/67, 16, 21, 59, 71; 380/44, 262, 380/278, 279
See application file for complete search history.

(56) References Cited

U.S. PATENT DOCUMENTS

| | | | |
|---|---|---|---|
| 4,317,957 A | | 3/1982 | Sendrow |
| 4,879,747 A | * | 11/1989 | Leighton et al. .............. 713/186 |
| 5,450,491 A | | 9/1995 | McNair |
| 5,835,599 A | | 11/1998 | Buer |
| 5,883,810 A | | 3/1999 | Franklin et al. |
| 6,000,832 A | | 12/1999 | Franklin et al. |
| 6,227,447 B1 | | 5/2001 | Campisano |
| 6,263,446 B1 | | 7/2001 | Kausik et al. |
| 6,341,724 B2 | | 1/2002 | Campisano |
| 6,980,970 B2 | | 12/2005 | Krueger et al. |

(Continued)

OTHER PUBLICATIONS

The International Search Report for Application No. PCT/US2009/047941, dated Jan. 19, 2011, 5 pages (Continued)

*Primary Examiner* — Dante Ravetti
(74) *Attorney, Agent, or Firm* — Kilpatrick Townsend & Stockton LLP

(57) ABSTRACT

A method for forming a dynamic verification value. The method includes altering a first data string to form a second data string, and forming a first dynamic verification value using at least a portion of the second data string. The first dynamic verification value is used to authenticate a phone in a first transaction. The second data string is used to form a third data string. A second dynamic verification value is formed using at least a portion of the third data string. The second dynamic verification value is used to authenticate the phone in a second transaction.

20 Claims, 7 Drawing Sheets

(56) References Cited

U.S. PATENT DOCUMENTS

| | | |
|---|---|---|
| 7,051,929 B2 | 5/2006 | Li |
| 7,099,850 B1 | 8/2006 | Mann, II et al. |
| 7,103,576 B2 | 9/2006 | Mann, II et al. |
| 7,177,848 B2 | 2/2007 | Hogan et al. |
| 7,343,351 B1 | 3/2008 | Bishop et al. |
| 7,347,361 B2 | 3/2008 | Lovett |
| 7,412,420 B2 | 8/2008 | Holdsworth |
| 7,437,575 B2 | 10/2008 | Dennis et al. |
| 2002/0026478 A1* | 2/2002 | Rodgers et al. ............. 709/205 |
| 2002/0153424 A1 | 10/2002 | Li |
| 2002/0180584 A1 | 12/2002 | McGregor et al. |
| 2005/0036611 A1* | 2/2005 | Seaton et al. ................ 380/44 |
| 2005/0043997 A1 | 2/2005 | Sahota et al. |
| 2006/0012473 A1* | 1/2006 | Bishop et al. ............ 340/539.1 |
| 2006/0149671 A1* | 7/2006 | Nix et al. ..................... 705/40 |
| 2007/0050398 A1* | 3/2007 | Mochizuki ................. 707/102 |
| 2007/0055872 A1* | 3/2007 | Soga et al. ................. 713/168 |
| 2007/0061571 A1* | 3/2007 | Hammes et al. ............ 713/168 |
| 2007/0136211 A1 | 6/2007 | Brown et al. |
| 2007/0208671 A1 | 9/2007 | Brown et al. |
| 2007/0266240 A1* | 11/2007 | Uneda et al. ............... 713/159 |
| 2007/0276765 A1 | 11/2007 | Hazel et al. |
| 2007/0276785 A1 | 11/2007 | Piedmonte |
| 2008/0029593 A1 | 2/2008 | Hammad et al. |
| 2009/0026478 A1 | 1/2009 | Yoon et al. |
| 2009/0055893 A1* | 2/2009 | Manessis et al. ............... 726/2 |
| 2009/0319430 A1 | 12/2009 | Faith et al. |

OTHER PUBLICATIONS

The International Written Opinion for Application No. PCT/US2009/047941, dated Jan. 19, 2011, 4 pages.

Final Office Action for U.S. Appl. No. 12/266,186, mailed May 26, 2011, 25 pages.

Notice of Allowance mailed Aug. 1, 2014 in U.S. Appl. No. 12/266,186, 17 pages.

* cited by examiner

MOBILE PHONE INCLUDING DYNAMIC VERIFICATION VALUE

CROSS-REFERENCES TO RELATED APPLICATIONS

This application is a continuation of U.S. patent application Ser. No. 12/266,186, filed on Nov. 6, 2008, which claims the benefit of U.S. Provisional Application No. 61/075,208, filed on Jun. 24, 2008, which is herein incorporated by reference in its entirety for all purposes.

NAMES OF PARTIES TO A JOINT RESEARCH AGREEMENT

Visa International Service Association and Visa U.S.A. Inc. are parties to a joint research agreement within the meaning of 35 U.S.C. §103(c).

BACKGROUND

As methods and devices for engaging in financial transactions have increased, old problems such as fraud and counterfeiting persist.

One of the primary sources of fraud, which is prevalent in the credit card industry is skimming. Skimming refers to the electronic copying of a card's magnetic stripe data to create counterfeit cards.

Skimming is a problem for contactless cards and cards with magnetic stripes. However, in a wireless environment, the opportunity to skim magnetic stripe data is more prevalent. In a wireless environment, a potential skimmer need not physically possess the card to be skimmed nor have access to any of the physical equipment (e.g. POS terminal, communication lines, etc.) which is required for skimming in a wire based environment. A skimmer can, without the knowledge of the consumer or merchant, intercept the wireless transaction and copy the data being transmitted from the card to POS terminal.

To address the above problems, a dCVV or a dynamic card verification value can be used. The dCVV can be generated using an algorithm which uses at least a counter and input data such as an account number, expiration date, and other information. The counter can increase by one each time a transaction is conducted. The dCVV can be independently generated by either a phone or POS terminal at the front end of a transaction and can be sent to a back end computer. The counter may be sent from the merchant to the back end computer so that it knows the current counter value associated with the phone. In other cases, the counter may simply be present at the back end computer. In the latter case, the counter increments every time the back end computer sees a transaction. The back end computer, using a similar algorithm to the one that generated the dCVV at the front end, the counter value, and input data, can independently generate a second dCVV. If the received dCVV and the generated dCVV match, the transaction can be considered authentic. If the dCVVs do not match, this may indicate that the transaction is fraudulent.

Although the above-described dCVV process is useful, improvements can be made. For example, in the dCVV process that is described above, a counter is used as a dynamic data element and generally passes unencrypted from a front end of a transaction to the back end of the transaction. Because the counter is in the open, it may still be possible that someone could intercept the counter and that someone could potentially figure out the dCVV (although it would be very difficult to do). Also, the counter itself is a rather simplistic dynamic data element that an unauthorized person could potentially determine. It would be desirable to provide for a verification value generation process that is even stronger than the dCVV method that is described above.

The above-described problems can also be present when phones are used in transactions.

Embodiments of the disclosure address the above problems, and other problems, individually and collectively.

BRIEF SUMMARY

Embodiments of the disclosure are directed to methods, phones, and systems for conducting transactions.

One embodiment of the invention is directed to a method comprising altering a first data string to form a second data string, and forming a first dynamic verification value using at least a portion of the second data string. The first dynamic verification value is used to authenticate a phone in a first transaction. The method also includes altering the second data string to form a third data string, and forming a second dynamic verification value using at least a portion of the third data string. The second dynamic verification value is used to authenticate the phone in a second transaction.

Another embodiment of the invention is directed to a computer readable medium. The computer readable medium comprises code for altering a first data string to form a second data string, and code for forming a first dynamic verification value using at least a portion of the second data string. The first dynamic verification value is used to authenticate a phone in a first transaction. The computer readable medium further comprises code for altering the second data string to form a third data string and code for forming a second dynamic verification value using at least a portion of the third data string. The second dynamic verification value is used to authenticate the phone in a second transaction.

Other embodiments of the invention are directed to computer apparatuses such as server computers, systems, etc., as well as computer readable media.

These and other embodiments of the disclosure are described in further detail below in the detailed Description with reference to the Figures.

BRIEF DESCRIPTION OF THE FIGURES

In the Figures, like numerals can designate like elements.

Figure 1:
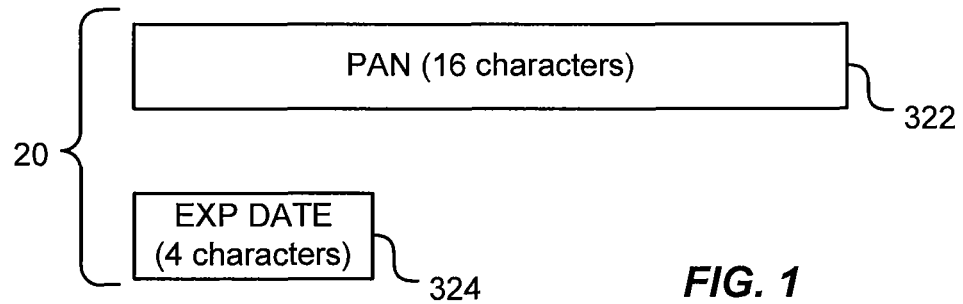
FIG. 1 shows a representation of a PAN and an expiration date.

DETAILED DESCRIPTION dCVVs, or dynamic card verification values, are described in U.S. patent application Ser. No. 10/642878, filed on Aug.

18, 2003, which is herein incorporated by reference in its entirety for all purposes. Embodiments of the invention are directed to new and useful methods for producing dynamic verification values such as dCVVs.

Some embodiments of the invention need not use counters. In embodiments of the invention, a recursive process is used to change data strings so that a verification value changes each time a transaction is conducted. For example, in embodiments of the invention, a data string that is generated is used to form a first dynamic verification value for a first transaction may be used as input data to form another data string that can be used to form a second dynamic verification value for a second transaction.

I. Verification Value Generation Processes

Illustratively, in one embodiment of the invention, an initial data string (e.g., comprising a PAN, or personal account number, with an expiration date overlaid on top of the PAN) is altered (e.g., encrypted) to form a first data string. The first data string may be an encrypted form of the initial data string. The first data string may be further altered (e.g., encrypted) to form a second data string.

A first dynamic verification value is then formed using at least a portion of the second data string. For example, in one embodiment of the invention, a portion of the second data string is selected, and the selected portion of the second data string and another data string (e.g., a pre-existing static or conventional dynamic CVV) may be used to calculate one or more values using a mod 10 algorithm or other check digit algorithm. Other data alteration algorithms could alternatively be used in other embodiments of the invention. In yet other embodiments, the first dynamic verification value may simply be the selected portion of the second data string or could even the same as the second data string.

Regardless of how the first dynamic verification value is formed, the first dynamic verification value is then used to authenticate a phone in a first transaction. The first transaction can be a purchase transaction, a money transfer transaction, etc. In an exemplary first purchase transaction, the first dynamic verification value can be transmitted from a phone to an access device such as a POS (point of sale) terminal, to a computer apparatus operated by a service provider such as an issuer (e.g., an issuing bank), or a payment processing organization (e.g., Visa). (Note that a "service provider" can be any suitable entity that may want to authenticate a device (e.g., a phone or an access device) at a front end of a transaction.) The first dynamic verification value may be transmitted to the computer apparatus operated by the service provider in an authorization request message. The authorization request message may request authorization to conduct the first transaction. It may also include information such as the PAN and other information.

Once the authorization request message is received by the service provider, the service provider may then independently re-generate the first dynamic verification value. If the re-generated first dynamic verification value is the same as the first dynamic verification value received from the access device, or if it is within an expected range of expected first dynamic verification values, the service provider may determine that the phone (or access device) that sent the first dynamic verification value is authentic.

When a second, subsequent transaction is conducted using the phone, the previously formed second data string can be used as input data for generating a third data string that can be used to form a second dynamic verification value.

In one embodiment of the invention, the second data string can be altered (e.g., encrypted) to form a third data string. For example, the third data string may be the second data string in its encrypted form. The second dynamic verification value may then be used to form the second dynamic verification value. It may be formed using the same or different process that is used to form the first dynamic verification value from the second data string. Once created, the second dynamic verification value can be used to authenticate the phone in a second transaction.

This process may be repeated for subsequent transactions. In the process that is described above, a counter is not used and is not transmitted from the access device to the service provider. Although a counter could be used in the above-described process, the counter's use is not necessary and it is possible to do away with the use of counters in embodiments of the invention.

Although the words "first" and "second" data strings are used herein, it is understood that the use of such terms is not limiting, and that embodiments of the invention can include third, fourth, etc. data strings may be formed in embodiments of the invention. Also, the use of the term "first data string" can refer to the very first data string generated by a phone or the like, or may refer to subsequent data strings generated by the phone or the like.

Further details regarding embodiments of the invention are described in further detail below with reference to the Figures. The exemplary processes described with reference to FIGS. 1-6 can be performed by a phone, an access device such as a POS terminal, or a computer apparatus operated by a service provider.

A first data string can be formed in any suitable manner. The formation of an exemplary first data sting according to one embodiment of the invention can be described with reference to FIGS. 1-3.

In one embodiment of the invention, an initial data string may be comprise personalized information including one or more of the following data elements: account number (e.g., a primary account number or PAN), an account sequence number, an expiration date, a CVV value, birthday, social security number, etc. Such personal data elements may be manipulated in any suitable manner to form the first data string.

Figure 2:
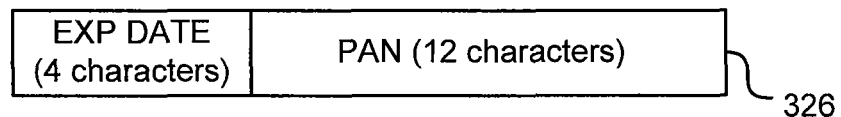
FIG. 2 shows a data string comprising an expiration date superimposed on a PAN.

Illustratively, as shown in FIG. 1, a PAN (primary account number) 322 and an expiration date 324 may first be obtained. As shown in FIG. 2, the expiration date 324 is superimposed on the left-most digits of the PAN. For example, if the PAN is the number "9999999799997999" and the expiration date is "01/01", then the formed data string 326 may be "0101999799997999." The formed data string 326 may be eight bytes of data.

Figure 3:
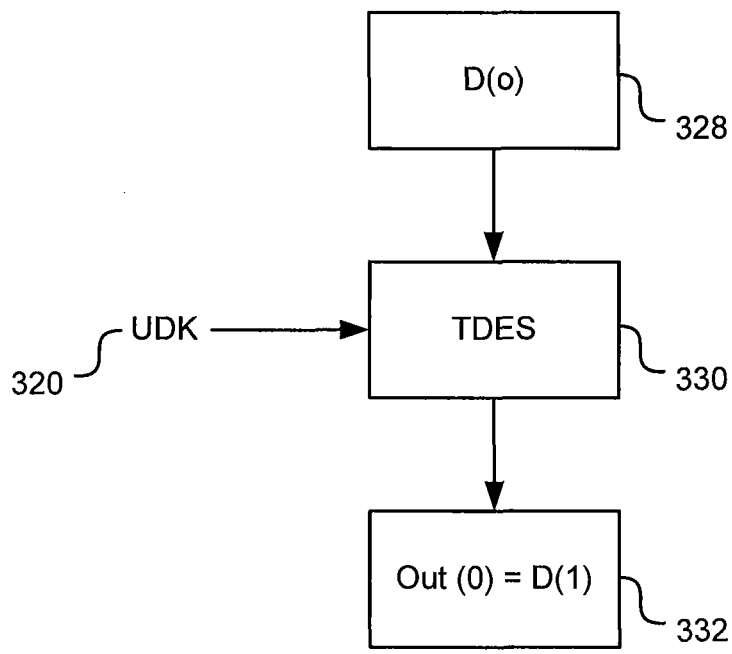
FIG. 3 shows a flowchart illustrating a method for forming a first data string.

Referring to FIGS. 2-3, the initial data string 326 in FIG. 2 can then be represented by D(0) 328 in FIG. 3. As shown in block 330, the initial data string 326 can then be altered (e.g., encrypted) using one or more uniquely derived keys 320 using an encryption algorithm such as a triple DES or DES algorithm. An exemplary process for forming uniquely derived keys is described below with reference to FIG. 6. Referring to FIG. 3, as shown in block 332, the output of the encryption process can be represented by Out(0) and this may be equal to D(1). Out(0) and D(1) may represent a first data string. It may be of the same length (e.g., 8 bytes) as the initial data string D(0).

After the first data string D(1) is formed, a first dynamic verification value may then be formed using the first data string D(1). The first dynamic verification value may be formed in any suitable manner. In some embodiments, the first data string is altered (e.g., encrypted) to form a second data string, and a portion of the second data string is selected. The portion of the second data string that is selected is then used to calculate the first dynamic verification value. In other embodiments, the second string D(2) could simply be the first dynamic verification value, or a portion of the second data string D(2) could be the first dynamic verification value.

Figure 4:
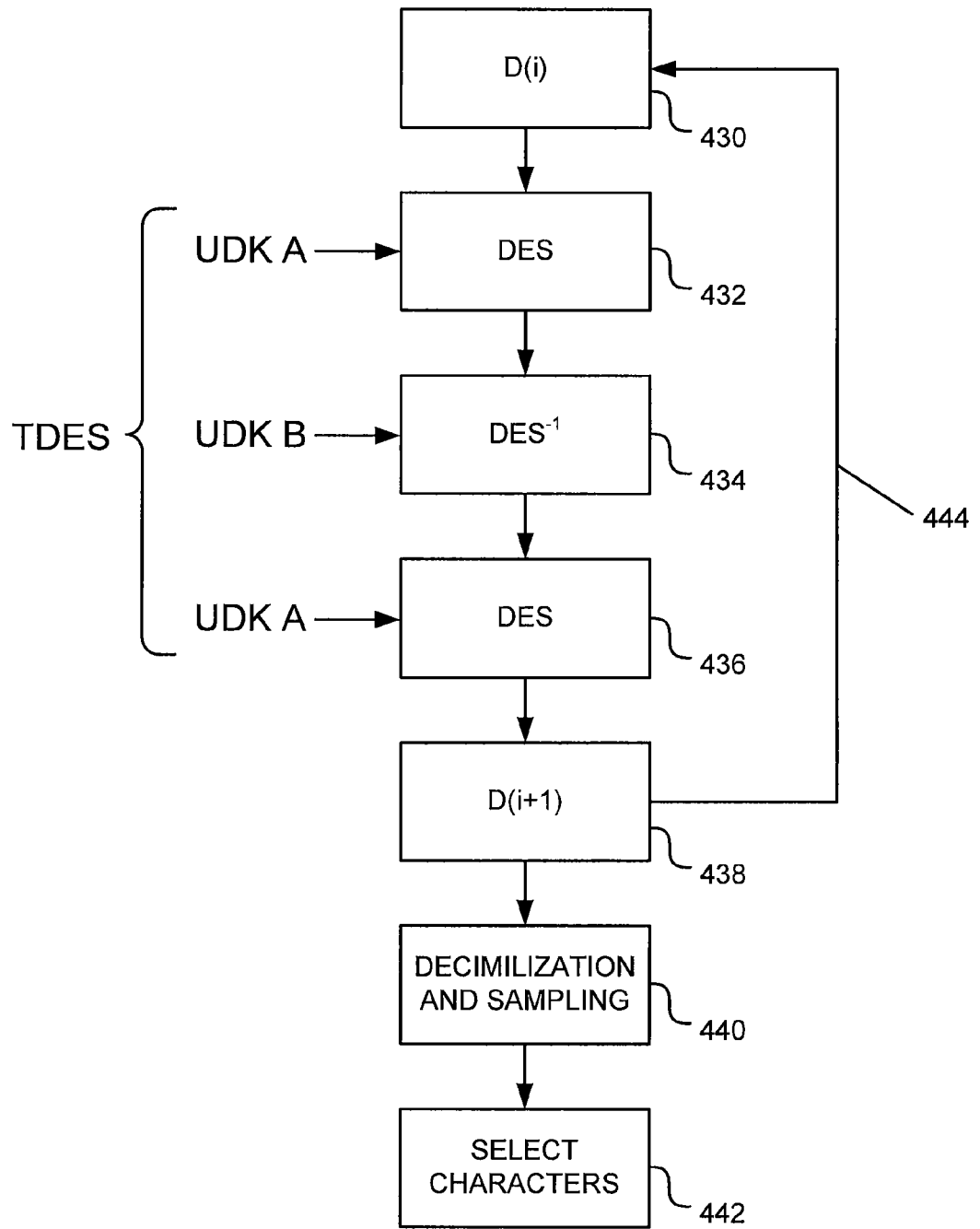
FIG. 4 shows another flowchart illustrating a method for recursively forming data strings and sampling of the formed data strings.

Illustratively, with reference to FIG. 4, as shown by block 430, the first data string D(1) may be altered using a triple DES algorithm. As shown in FIG. 4, in blocks 432, 434, and 436, at least two different types of UDKs (UDK A for 432, UDK B for 434, and UDK A for 436) in a triple DES encryption process and can be used to alter the first data string D(1) to form a second data string (e.g., D(2)) in block 438. The second data string (e.g., D(2)) may then be stored in a memory in a portable phone (or other device that is used to generate the dynamic verification value). As will be described in further detail below, the second data string D(2) may be used to generate a subsequent verification value.

As shown in block 440, a decimalization and/or sampling process (block 440) can then take place. A predetermined number of characters (block 442) may then be selected from the characters in the second data string D(2) from block 440. In some embodiments, the three leftmost characters and the three rightmost characters of the second data string are selected. Conventional hardware security modules (HSMs) are capable of selecting sets of three characters from data strings so minimal changes would be needed to implement embodiments of the invention. In other embodiments, more than three or less than three characters can be selected.

Figure 5:
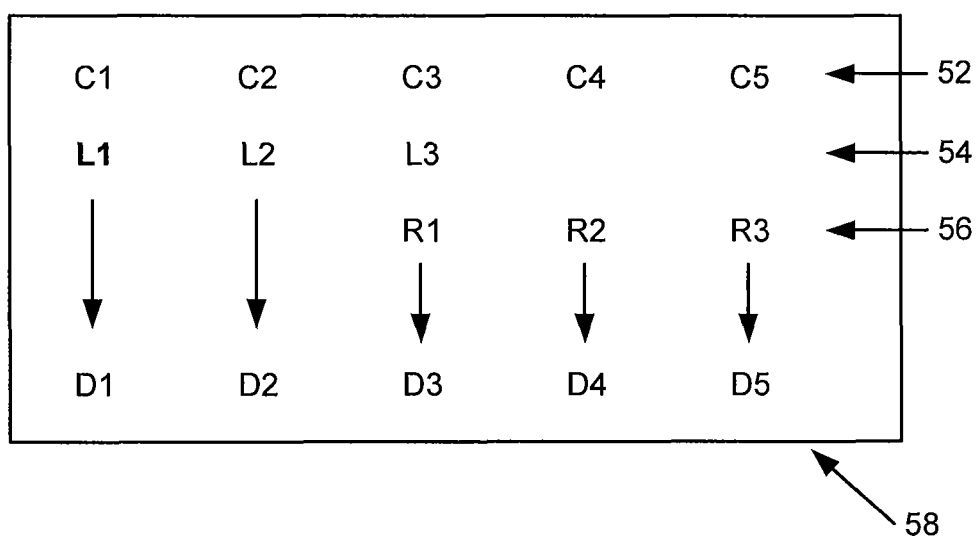
FIG. 5 shows how a dynamic verification value can be formed.

With reference to FIG. 5, after a predetermined number of characters is selected from the second data string D(2), the first dynamic verification value may be determined. In one embodiment, a conventional dynamic verification value 52 may first be obtained. The conventional dynamic verification value 52 may be a traditional card verification value that includes three characters concatenated with an ATC (automatic transaction counter). This may form the five character data string 52, which may itself be dynamic in nature. In other embodiments, the conventional dynamic verification value 52 could alternatively be a static five character value. The static or dynamic value could include or be derived from personal information such as a CVV value, birthday, social security number, etc.

As noted above, from the previously described second data string 438, one can take a first set of characters 54 such as the three leftmost characters L1, L2, and L3, and a second set of characters 56 such as the three rightmost characters R1, R2, and R3, and may line them up as shown in FIG. 5. For example, if the second data string 438 is "1234567891234567," then L1, L2, and L3 would respectively be 1, 2, and 3. R1, R2, and R3 would respectively be 5, 6, and 7. Note that the first set of characters 54 and the second set of characters 56 could be lined up in other ways in other embodiments of the invention.

The first dynamic verification value can then be formed using the first and second sets of characters 54, 56 from the second data string D(2), and the conventional dynamic verification value 52. As shown by the arrows 50, a data manipulation process such as a mod 10 calculation may be performed to form the values D1, D2, D3, D4, and D5. For example, a mod 10 calculation may be performed on the characters C3, L3, and R1 to form the value D3. The characters D1, D2, D3, D4, and D5 may form a first dynamic verification value. The first dynamic verification value can be used to authenticate a phone in a first transaction, as described above and as will be described in detail below.

Illustratively, the digits C1, C2, and C3 may be "765" and the counter value may be "03" so that the first dynamic verification value that is formed is "76503." The second data string D(2) may be "5678912345678912." The values L1-L3 may be "567" and R1-R3 may be "912." Using the numbers in this specific example, the values D1-D5 may be "21383" (i.e., the dynamic verification value) and may be determined using an exemplary check digit algorithm formation algorithm such as a mod 10 algorithm.

A mod 10 algorithm is an example of a check-digit algorithm and is described in U.S. Pat. No. 2,950,048 (which is herein incorporated by reference) and other sources and is generally used to verify the accuracy of a string of numbers. In other embodiments of the invention, a data manipulation process other than a mod 10 algorithm could be used to form the first dynamic verification value. Check digit algorithms are desirable in some embodiments as they are readily implementable. Also, it is not intuitive to use a check digit algorithm to alter numbers, since check digit formation algorithms are typically used to provide a number that is used to verify the accuracy of a string of digits, not to alter data.

In FIG. 5, the first and second character sets 54, 56 are overlaid with the conventional dynamic verification value 52 so that at least one number in the first and second character sets 54, 56 overlap. In other embodiments, none of the characters in the first and second character sets 54, 56 need to overlap. In yet other embodiments of the invention, there can be additional character sets and more than one character from each character set can overlap with other characters from other character sets.

Referring again to FIG. 4, when a second transaction is conducted using the phone, a second dynamic verification value may be formed by the phone. The second dynamic verification value may be formed using the previously described second data string D(2). As shown in FIG. 4, the second data string D(2) can be retrieved from the memory in the phone and may be input into block 430. This value can be input into block 430 to form a subsequent data string that can be used to form a subsequent dynamic verification value. As explained above, a triple DES encryption algorithm (blocks 432, 434, 436) using UDKs A and B may be used to alter the second data string D(2) to form a third data string D(3) (block 438). A decimalization and/or a sampling process 440 and a select characters process 442 may then be performed. Sets of characters including the three leftmost and the three rightmost characters of the third data string D(3) can be selected.

Then, a second dynamic verification value can be formed with reference to FIG. 5. As in the case where the first dynamic verification value is formed, C1, C2, C3, C4, C5 may be a conventional CVV value concatenated with a counter value (or other dynamic data element). The counter value may have incremented by one from the prior transaction that was conducted using the phone. The three leftmost characters (L1, L2, L3) and the three rightmost characters (R1, R2, R3) of the third data string D(3) may then be manipulated with the values C1, C2, C3, C4, C5 using a mod 10 calculation. The resulting values D1, D2, D3, D4, D5 may form a second dynamic verification value. The second dynamic verification value may be used to authenticate the phone in a second transaction.

Although the formation of first and second dynamic verification values for first and second transactions is described above, it is understood that this process can be repeated for subsequent transactions.

Figure 6:
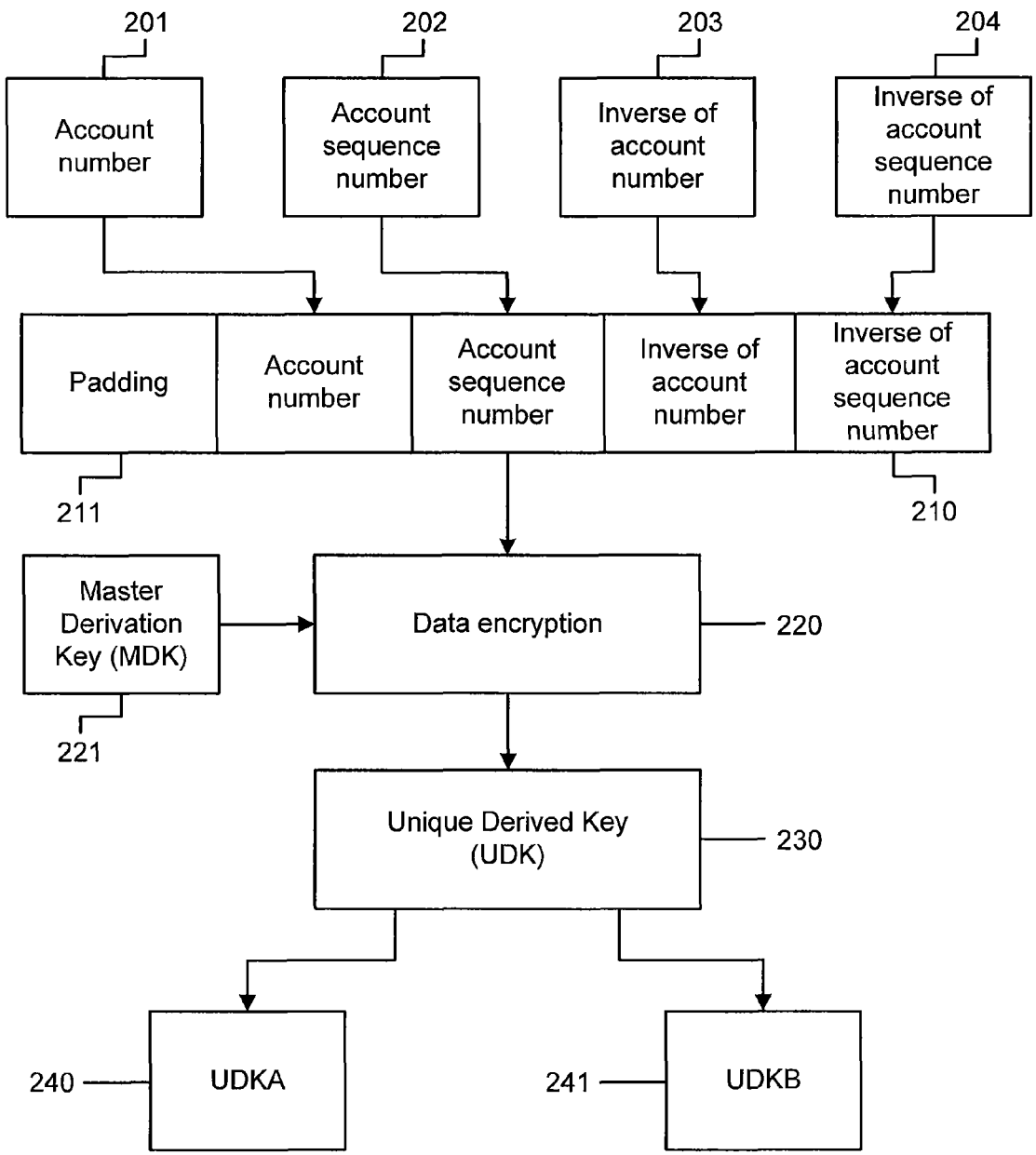
FIG. 6 shows a diagram illustrating a process for forming two uniquely derived keys.

An exemplary process for forming a uniquely derived key may be described with reference to FIG. 6. FIG. 6 shows the methodology for deriving two unique keys. An account number 201, an account sequence number 202, an inverse of the account number 203, and an inverse of the account sequence number 204 are concatenated together to create a concatenated value 210. If necessary, the concatenated value 210 may be padded with zeroes, or some other value 211, to create a string of a predetermined fixed length. In a preferred embodiment, the concatenated value 210 may be 128 bits in length, although the concatenated value is not limited to being this length. The concatenated value 210 is then encrypted 220 using the master derivation key 221 as the encryption key for each encryption stage. The encryption utilized may include any suitable type of encryption methodology. For example, this encryption step may utilize DES, Triple-DES, or any other suitable algorithm. The value resulting from the encryption step 220 is a unique derived key or UDK 230. If desired, the UDK 230 may be further processed to form another UDK. For example, the UDK 230 may be segmented into different parts to form multiple UDKs such as UDKA 240 and UDKB 241.

The dynamic verification value formation processes described above have a number of advantages. Compared to a conventional DCVV process, it is extremely difficult to break. Each data string that is manipulated may be derived from personal information such as a consumer's account number, expiration date, etc. Each data string may further be encrypted using uniquely derived keys which are also personal to a consumer. Further, since a counter value need not be used, embodiments of the invention are more secure than conventional DCVV generation processes. The changing data strings are more complex than simple counters, and are more difficult to break.

II. Purchase Transaction Systems and Methods

A. Purchase Systems

To illustrate how embodiments of the invention might be used, some exemplary purchase transactions can be described.

Figure 7:
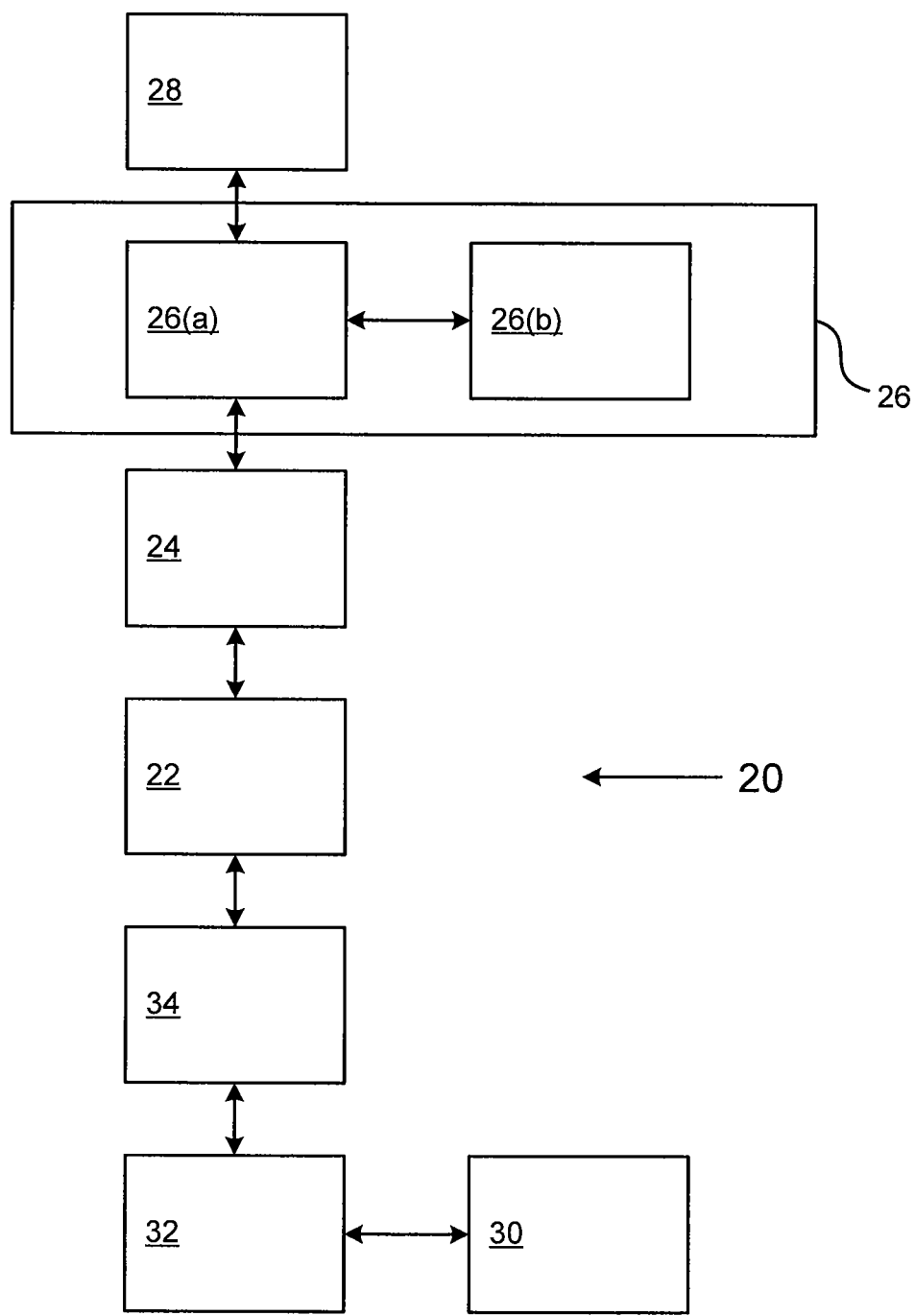
FIG. 7 shows a block diagram of a system according to an embodiment of the invention.

FIG. 7 shows a block diagram of a purchase transaction system. Embodiments of the invention are not limited to the described embodiments. For example, although separate functional blocks are shown for an issuer, payment processing system, and acquirer, in FIG. 7, some entities perform all of these functions and may be included in embodiments of invention.

FIG. 7 shows a system that can be used in an embodiment of the invention. The system includes a merchant 22 and an acquirer 24 associated with the merchant 22. In a typical payment transaction, a consumer 30 may purchase goods or services at the merchant 22 using a phone 32'. The acquirer 24 can communicate with an issuer 28 via a payment processing network 26.

The payment processing network 26 may include data processing subsystems, networks, and operations used to support and deliver authorization services, exception file services, and clearing and settlement services. An exemplary payment processing network operated by the payment processing organization may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer 26(a) and a consumer database 26(b) coupled to the server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The server computer may also have a processor and a computer readable medium, which comprises code or instructions that the processor can execute. The payment processing network 26 may use any suitable wired or wireless network, including the Internet.

The merchant 22 may also have, or may receive communications from, an access device 34 that can interact with the phone 32'. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the phone 32'.

B. Purchase Methods

In an exemplary purchase method, a consumer 30 using a phone 32' may purchase an item from a merchant 22. The consumer 30 may take the phone 32' and may interface it with the merchant's access device 34. In one embodiment, the phone 32' (using a processor and memory that are present therein) may generate a first dynamic verification value as described above. In another embodiment, the phone 32' may pass information (e.g., a PAN, expiration date, etc.) necessary to generate the first dynamic verification value to the access device 34 and the access device 34 may generate the first dynamic verification value. In the former embodiment, the phone 32' may comprise a computer readable medium comprising code for altering a first data string to form a second data string, code for forming a first dynamic verification value using at least a portion of the second data string, wherein the first dynamic verification value is used to authenticate a phone in a first transaction, and code for altering the second data string to form a third data string. It may also comprise code for forming a second dynamic verification value using at least a portion of the third data string, wherein the second dynamic verification value is used to authenticate the phone in a second transaction. In the latter embodiment, the access device 34 may have the computer readable medium with one or more of these features. In other embodiments, the computer readable medium may be embodied by separate memories in separate devices such as an access device and a phone.

Regardless of whether the first dynamic verification value is generated by the access device 34 or the phone 32, the first dynamic verification value may then be included in an authorization request message, which is then sent by the access device 34 to the server computer 26(a) operated by the payment processing network 26 via the merchant 22 and the acquirer 24. The authorization request message may include a PAN, transaction amount, and other information, and may request authorization to proceed with the transaction being conducted.

The server computer 26(a) may receive the first dynamic verification value, and may thereafter retrieve the consumer's personal information from the consumer database 26(b). It may then try and independently generate the first dynamic verification value using the above-described methodology. If the received first dynamic verification value and the independently generated verification value match, or if the received verification value is otherwise expected, the transaction may be authorized. If there is no match, or the received value is not expected, then the transaction may be declined.

If the phone 32' is authenticated, then the issuer 28 may be notified, and the issuer 28 may approve or decline the transaction depending on whether the consumer 30 has sufficient funds or credit to conduct the transaction. The issuer 28 may then send an authorization response message to the consumer 30, and the merchant 22 via the acquirer 24. It may indicate whether or not the transaction was authorized.

In some instances, there may not be an exact match between the first verification received from an access device and the first dynamic verification value that is independently generated by a server computer. The transaction may be authentic, even though the first dynamic verification values do not match. The received first dynamic verification value may not match the independently generated verification value for a variety of reasons. For example, there could be a breakdown in communication during a particular transaction between a service provider server computer and an access device. In this case, the server computer dynamic verification value may not update while the dynamic verification value on the phone being used does update. In this case, it may be possible for the server computer to cycle through a reasonable number (e.g., 10 or less, or 5 or less) additional dynamic verification values to determine if a generated verification value matches the received verification value. If a match is found, the server computer may store the verification value and any values used to generate the verification value so that it is up to date for the next transaction that is conducted.

In the example in FIG. 7, the payment processing network 26 may operate a server computer 26(*a*) which generates dynamic verification values and determines whether or not the received dynamic verification value is in fact authentic. In other embodiments, another type of service provider (e.g., the issuer 28, a third party process (not shown), etc.) may operate a server computer to perform this function).

III. Phones and Computer Apparatuses

Figure 8A:
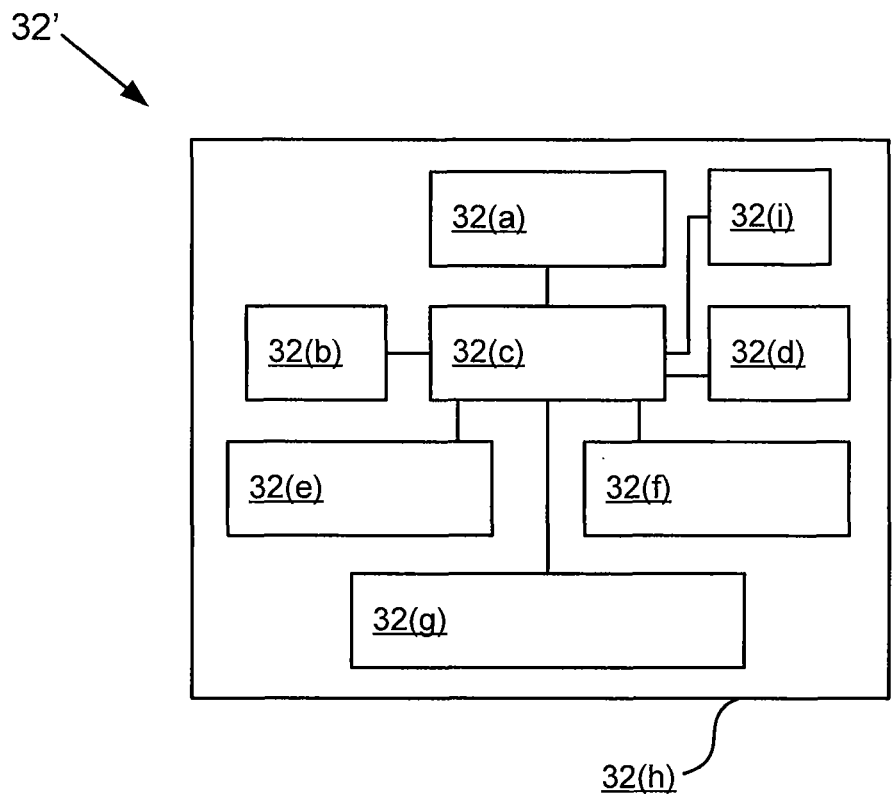
FIG. 8 shows a block diagram of a phone.
Figure 8B:
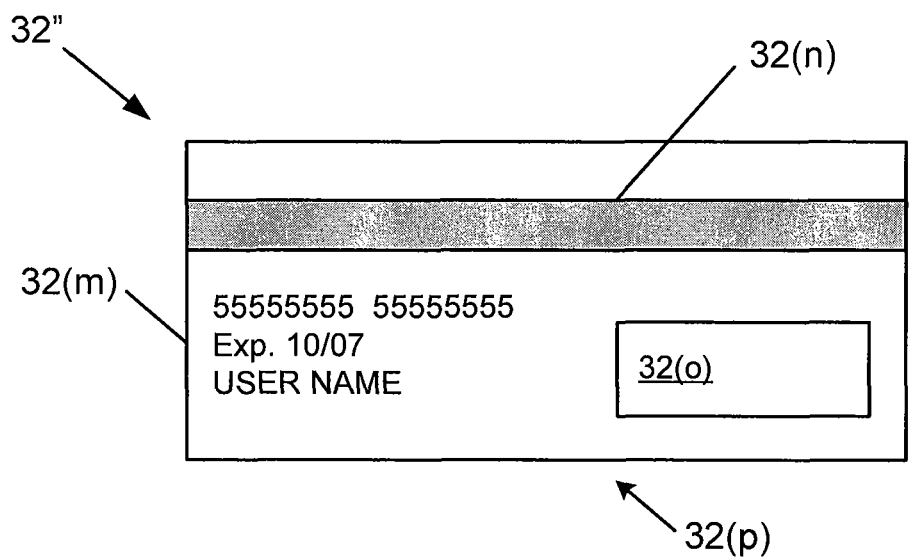

FIG. 8(*a*) shows a block diagram of portable computer device in the form of a phone and subsystems that may be present in computer apparatuses in systems according to embodiments of the invention.

The phone 32' (shown in FIG. 7) may be in any suitable form. For example, suitable phones can be hand-held and compact so that they can fit into a consumer's wallet and/or pocket (e.g., pocket-sized). The phone can be a debit device, credit device, or stored value device.

An exemplary phone 32' may comprise a computer readable medium and a body as shown in FIG. 8. (FIG. 8 shows a number of components, and the phones according to embodiments of the invention may comprise any suitable combination or subset of such components.) The computer readable medium 32(*b*) may be present within the body 32(*h*), or may be detachable from it. The body 32(*h*) may be in the form a plastic substrate, housing, or other structure. The computer readable medium 32(*b*) may be a memory that stores data and may be in any suitable form including a memory chip. Data that can be stored includes uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the phone 32'.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 32' may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) phone 32' and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(*c*) (e.g., a microprocessor) for processing the functions of the phone 32' and a display 32(*d*) to allow a consumer to see phone numbers and other information and messages. The phone 32' may further include input elements 32(*e*) to allow a consumer to input information into the device, a speaker 32(*f*) to allow the consumer to hear voice communication, music, etc., and a microphone 32(*i*) to allow the consumer to transmit her voice through the phone 32'. The phone 32' may also include an antenna 32(*a*) for wireless data transfer (e.g., data transmission).

Figure 9:
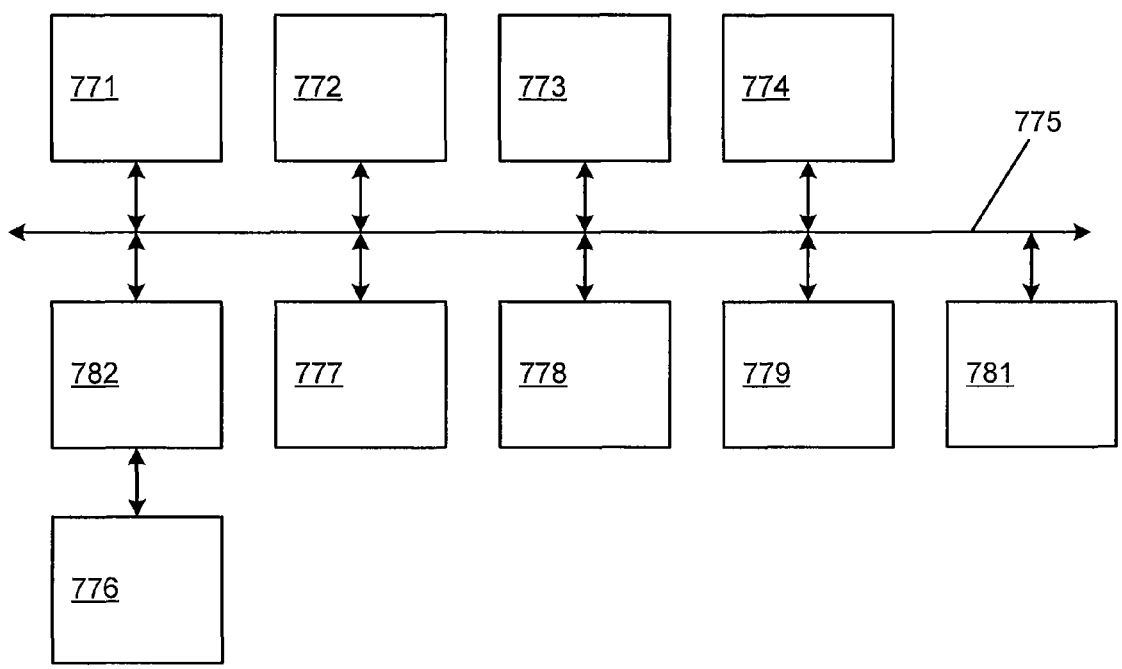
FIG. 9 shows a block diagram of a computer apparatus according to an embodiment of the invention.

The various participants and elements in FIG. 7 may operate one or more computer apparatuses to facilitate the functions described herein. Any of the elements in FIG. 7 may use any suitable number of subsystems to facilitate the functions described herein. Examples of such subsystems or components are shown in FIG. 9. The subsystems shown in FIG. 9 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Modifications, additions, or omissions may be made to the method without departing from the scope of the disclosure. The method may include more, fewer, or other steps. Additionally, steps may be performed in any suitable order without departing from the scope of the disclosure.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a," "an," or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

The invention claimed is:

1. A method comprising:
altering, by a phone, during a first payment transaction, a first data string;
forming, by the phone, a second data string;
forming, by the phone, a first dynamic verification value using a portion of the second formed data string;
providing, by the phone, the first dynamic verification value and a primary account number to a first point of sale terminal,
wherein the point of sale terminal generates a first authorization request message comprising the provided primary account number, a first transaction amount and the provided first dynamic verification value, and send the generated first authorization request message comprising the provided first dynamic verification value, the first transaction amount, the provided first dynamic verification value to a server computer;
wherein the server computer then verifies the first dynamic verification value, and receives an authorization response message from the server computer approving of the first payment transaction;
altering, by the phone, during a second payment transaction, the formed second data string;
forming, by the phone, a third data string;
forming, by the phone, a second dynamic verification value using a portion of the third data string;
providing, by the phone, the formed second dynamic verification value and the provided primary account number to a second point of sale terminal;
wherein the second point of sale terminal generates a second authorization request message comprising the provided primary account number, a second transaction amount, and the formed second dynamic verification value and sends the second authorization request message comprising the provided primary account number, the second transaction amount, and the second dynamic verification value to the server computer; and
wherein the server computer verifies the second dynamic verification value, and receives a second authorization response message approving the second payment transaction.

2. The method of claim 1 wherein the first data string is derived from the primary account number and an expiration date superimposed on at least a portion of the primary account number.

3. The method of claim 1 wherein forming the first dynamic verification value using at least the portion of the second data string comprises selecting a number of characters from the second data string.

4. The method of claim 1 wherein forming the first dynamic verification value using at least the portion of the second data string comprises:
selecting a number of characters from the second data string; and
forming the first dynamic verification value using a card verification value, a counter, and the selected number of characters.

5. The method of claim 4 wherein forming the first dynamic verification value using the card verification value, the counter, and the selected number of characters comprises combining the card verification value and the counter, and performing a mod 10 calculation using the combined card verification and counter, and the selected number of characters.

6. The method of claim 1 wherein altering comprises encrypting.

7. The method of claim 1, wherein forming the first dynamic verification value comprises determining each character of the first dynamic verification value based at least in part on at least one selected character of the second data string and at least one character of at least one further data string.

8. The method of claim 1 wherein the phone comprises a contactless element capable of near field communication with an access device.

9. The method of claim 1 wherein the phone comprises a memory comprising Track 1 and Track 2 data.

10. The method of claim 1 wherein forming the first dynamic verification value using at least a portion of the second data string comprises forming the first dynamic verification value using only the portion of the second data string; and
wherein forming the second dynamic verification value using at least a portion of the third data string, comprises forming the second dynamic verification value using only the portion of the third data string.

11. A phone comprising:
a processor;
a memory element coupled to the processor;
a computer readable hardware device comprising code executable, when executed by the processor causes the processor to perform the steps of:

altering, during a first payment transaction, a first data string;
forming a second data string;
forming a first dynamic verification value using a portion of the second formed data string;
providing the first dynamic verification value and a primary account number to a first point of sale terminal,
wherein the point of sale terminal generates a first authorization request message comprising the provided primary account number, a first transaction amount and the provided first dynamic verification value, and send the generated first authorization request message comprising the provided first dynamic verification value, the first transaction amount, the provided first dynamic verification value to a server computer;
wherein the server computer then verifies the first dynamic verification value, and receives an authorization response message from the server computer approving of the first payment transaction;
altering during a second payment transaction, the formed second data string;
forming a third data string;
forming a second dynamic verification value using a portion of the third data string;
providing the formed second dynamic verification value and the provided primary account number to a second point of sale terminal;
wherein the second point of sale terminal generates a second authorization request message comprising the provided primary account number, a second transaction amount, and the formed second dynamic verification value and sends the second authorization request message comprising the provided primary account number, the second transaction amount, and the second dynamic verification value to the server computer; and
wherein the server computer verifies the second dynamic verification value, and receives a second authorization response message approving the second payment transaction.

12. The phone of claim 11, wherein the first data string is derived from the primary account number and an expiration date superimposed on at least a portion of the primary account number.

13. The phone of claim 11, wherein forming the first dynamic verification value using at least the portion of the second data string comprises selecting a number of characters from the second data string.

14. The phone of claim 11, wherein forming the first dynamic verification value using at least the portion of the second data string comprises the steps of:
selecting a number of characters from the second data string; and
forming the first dynamic verification value using a card verification value, a counter, and the selected number of characters.

15. The phone of claim 14, wherein forming the first dynamic verification value using the card verification value, the counter, and the selected number of characters comprises combining the card verification value and the counter, and performing a mod 10 calculation using the combined card verification and counter, and the selected number of characters.

16. The phone of claim 11, wherein altering comprises encrypting.

17. The phone of claim 11, wherein forming the first dynamic verification value comprises determining each character of the first dynamic verification value based at least in part on at least one selected character of the second data string and at least one character of at least one further data string.

18. The phone of claim 11, further comprising a contactless element capable of near field communication with an access device.

19. The phone of claim 11, wherein the memory comprises Track 1 and Track 2 data.

20. The phone of claim 11, wherein forming the first dynamic verification value using at least a portion of the second data string comprises forming the first dynamic verification value using only the portion of the second data string; and
wherein forming the second dynamic verification value using at least a portion of the third data string, comprises forming the second dynamic verification value using only the portion of the third data string.

* * * * *

UNITED STATES PATENT AND TRADEMARK OFFICE
CERTIFICATE OF CORRECTION

PATENT NO.         : 8,954,353 B2                                   Page 1 of 1
APPLICATION NO.    : 12/268273
DATED              : February 10, 2015
INVENTOR(S)        : Patrick Faith et al.

It is certified that error appears in the above-identified patent and that said Letters Patent is hereby corrected as shown below:

In the Claims
Column 11, Claim 1, line 13, replace "send" with --sends--;
Column 13, Claim 11, line 13, replace "send" with --sends--.

Signed and Sealed this
Eighteenth Day of August, 2015

Michelle K. Lee
*Director of the United States Patent and Trademark Office*